United States Patent
Bagnall et al.

(10) Patent No.: US 8,206,079 B2
(45) Date of Patent: Jun. 26, 2012

(54) TEMPERATURE CONTROLLING APPARATUS

(75) Inventors: Adam MacGregor Bagnall, Derbyshire (GB); Clive Lockwood, Derby (GB)

(73) Assignee: Rolls Royce PLC (GB)

( * ) Notice: Subject to any disclaimer, the term of this patent is extended or adjusted under 35 U.S.C. 154(b) by 1068 days.

(21) Appl. No.: 12/107,178

(22) Filed: Apr. 22, 2008

(65) Prior Publication Data

US 2008/0273972 A1    Nov. 6, 2008

(30) Foreign Application Priority Data

May 2, 2007    (GB) .................................. 0708459.3

(51) Int. Cl.
*F01D 5/18* (2006.01)

(52) U.S. Cl. .......... 415/11; 415/116; 415/108; 415/145; 415/176; 415/178

(58) Field of Classification Search .............. 415/11, 415/115, 116, 108, 144, 145, 173.1, 176, 415/178, 179
See application file for complete search history.

(56) References Cited

U.S. PATENT DOCUMENTS

| | | | | |
|---|---|---|---|---|
| 2,469,375 A | * | 5/1949 | Flagle | 415/47 |
| 4,187,054 A | * | 2/1980 | Landis et al. | 415/115 |
| 4,419,045 A | * | 12/1983 | Andre et al. | 415/119 |
| 4,999,994 A | | 3/1991 | Rud et al. | |
| 5,088,277 A | * | 2/1992 | Schulze | 60/39.093 |
| 5,417,056 A | | 5/1995 | Johnson et al. | |
| 5,584,651 A | * | 12/1996 | Pietraszkiewicz et al. | 415/115 |
| 5,644,918 A | | 7/1997 | Gulati et al. | |
| 6,164,912 A | | 12/2000 | Tabbita et al. | |
| 6,351,947 B1 | | 3/2002 | Keller et al. | |
| 6,375,416 B1 | | 4/2002 | Farrell et al. | |
| 6,425,240 B1 | | 7/2002 | Park | |
| 6,758,651 B2 | * | 7/2004 | Tomita et al. | 415/115 |
| 7,331,182 B2 | | 2/2008 | Graf et al. | |
| 2003/0035719 A1 | | 2/2003 | Wadia et al. | |
| 2005/0109011 A1 | * | 5/2005 | Courtot et al. | 60/39.093 |

FOREIGN PATENT DOCUMENTS

| | | |
|---|---|---|
| EP | 0597138 A1 | 11/1992 |
| EP | 0924382 A3 | 8/2000 |
| GB | 637598 A | 5/1950 |
| GB | 697093 A | 9/1953 |
| GB | 0746596 | 3/1956 |
| WO | 2006059935 A1 | 6/2006 |

\* cited by examiner

*Primary Examiner* — Igor Kershteyn
(74) *Attorney, Agent, or Firm* — McCormick, Paulding & Huber LLP

(57) ABSTRACT

An apparatus for controlling the temperature of a component, which is situated in use in a gas stream, provides a nozzle to create a jet of air at an angle to the gas stream, the jet being directed into the region of the stagnation point of the component so as to control the temperature of the component. The invention is particularly suited to preventing or reducing the formation of ice on vanes of gas turbine engines, but may also be applied to other components, and may equally be used in situations where a component is to be cooled rather than heated.

9 Claims, 4 Drawing Sheets

TEMPERATURE CONTROLLING APPARATUS

CROSS REFERENCE TO RELATED APPLICATION

This application is entitled to the benefit of British Patent Application No. GB 0708459.3 filed on May 2, 2007.

FIELD OF THE INVENTION

This invention relates to components that are situated in use in a gas stream, and whose temperature needs to be controlled.

BACKGROUND OF THE INVENTION

For example, it is known that certain regions of a gas turbine engine—particularly those nearest the air intake—may be susceptible to ice formation on components such as guide vanes, struts and duct walls. Icing may occur at any time, whether or not the engine is running, if the atmospheric conditions are appropriate. When the engine is running, icing may occur during ground running, at idle or at higher engine speeds, as well as during operation in flight. In such circumstances ice may build up on, and then be shed from, these components, and the ice may cause damage to other components further downstream in the engine. The risk of icing is exacerbated when the design of the engine is such that the fan or low-pressure compressor imparts only a small temperature rise to the air. If ice has built up on components of the engine while it is not running, it may or may not be shed from the engine immediately on starting.

In order to avoid ice build-up on vulnerable components it is known to make these components hollow, so that hot air from the combustor or elsewhere in the engine can be used to warm the component and thereby prevent icing. However, hollow components increase engine complexity, and consequently manufacturing costs and timescales. In cases where components have complicated 3D geometry for aerodynamic reasons, as is increasingly common, it may be difficult or impossible to make them hollow. Components, which move or rotate (such as variable vanes), add yet more complexity and potential leakage, because the hot air flow must be provided through a rotating spindle to the component.

Furthermore, this method of heating the component relies principally on heat soak through the component walls. It is therefore relatively inefficient, and has the further disadvantage that it tends to heat the whole component, not only that part of it susceptible to icing.

It would therefore be desirable to have an improved method of preventing icing of components, which overcomes the disadvantages of known techniques.

SUMMARY OF THE INVENTION

According to the invention, there is provided an apparatus for controlling the temperature of a component, the component situated in use in a duct in which flows a gas stream, whereby a stagnation point is created in the region of an upstream portion of the component, the apparatus including a nozzle to create a jet of air at an angle to the gas stream, the jet being directed into the region of the stagnation point of the component so as to control the temperature of the component, characterised in that the nozzle is located in a wall of the duct.

According to another aspect of the present invention, a gas turbine engine having, in axial flow series, an air intake, a propulsive fan, an intermediate pressure compressor, a high pressure compressor, a combustor, a turbine including a high pressure turbine, an intermediate pressure turbine and a low pressure turbine, and an exhaust nozzle, said turbines including a plurality of components, with each component situated in use in a duct in which flows a gas stream, whereby a stagnation point is created in the region of an upstream portion of the component, the apparatus including a nozzle to create a jet of air at an angle to the gas stream, the jet being directed into the region of the stagnation point of the component so as to control the temperature of the component, characterised in that the nozzle is located in a wall of the duct.

DETAILED DESCRIPTION OF THE PREFERRED EMBODIMENTS

Figure 1:
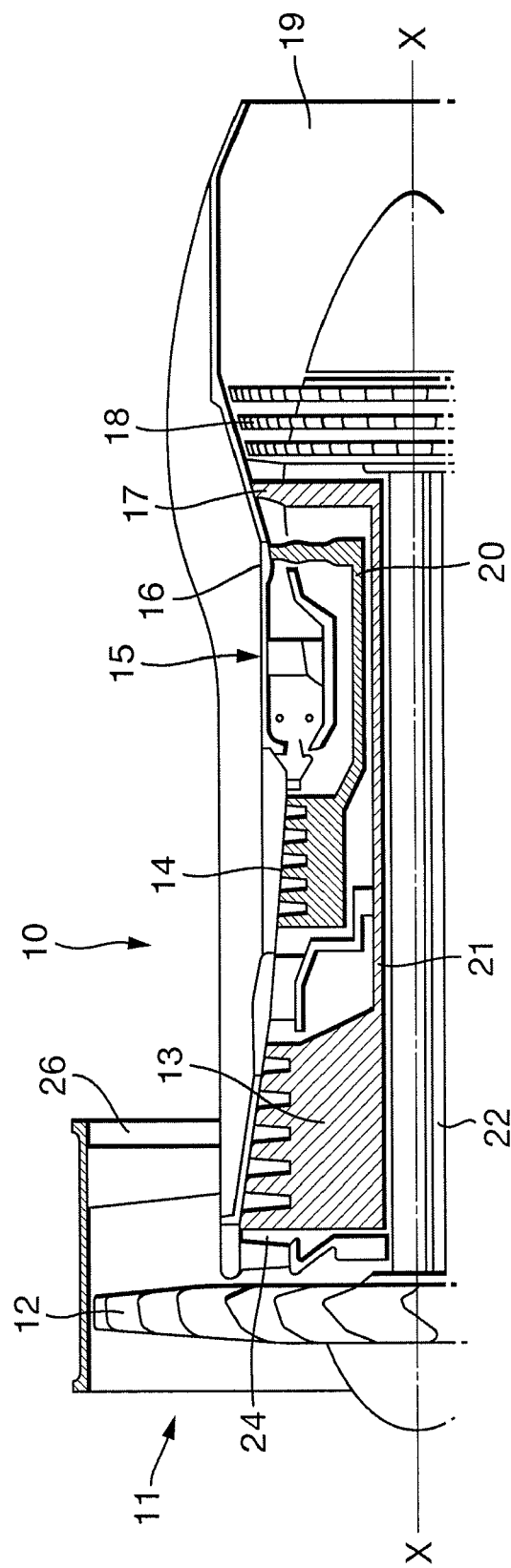
FIG. 1 is a schematic partial section of a gas turbine engine of known type.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine comprising a high pressure turbine 16, an intermediate pressure turbine 17 and a low pressure turbine 18, and an exhaust nozzle 19.

The gas turbine engine 10 operates in a conventional manner. Air entering the intake 11 is accelerated by the fan 12, which produces two air flows—a first air flow passes through an annular duct 24 into the intermediate pressure compressor 13 and a second air flow passes through an annular bypass duct 26 and provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by concentric shafts 20, 21 and 22, which rotate about an axis X-X.

Figure 2:
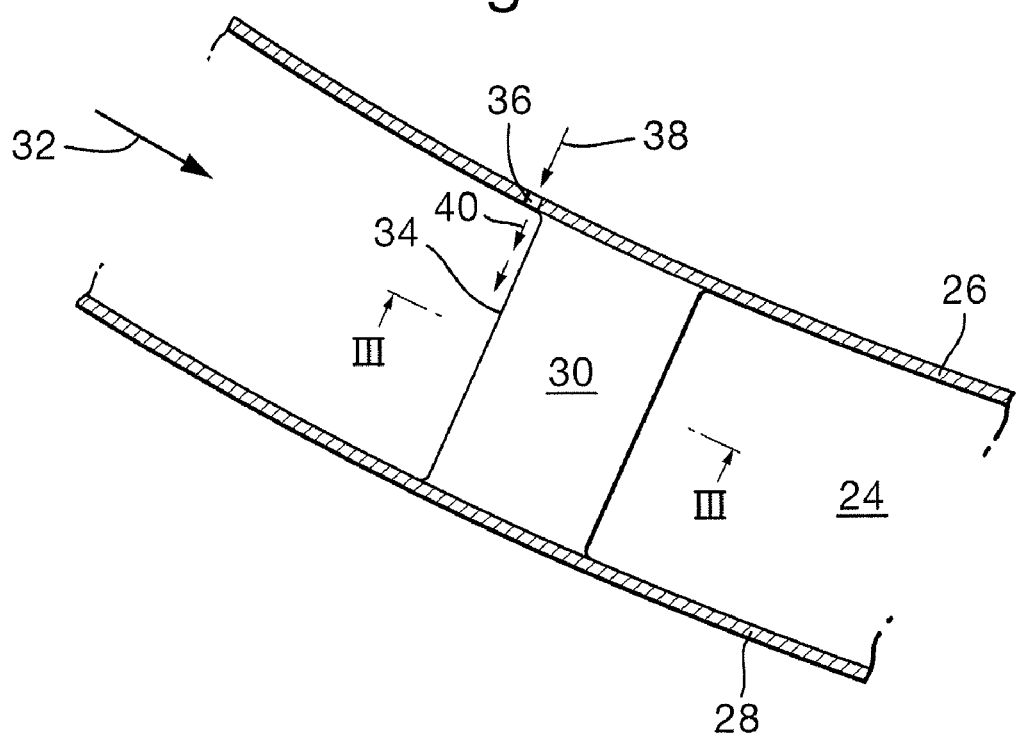
FIG. 2 is a schematic sectional view of an apparatus according to the invention.

FIG. 2 shows part of the duct 24 indicated in FIG. 1. The duct is defined by radially outer and radially inner walls, respectively 26 and 28, and contains an annular array of vanes 30, of which one is shown. The vanes 30 are secured between the duct walls 26, 28.

In use, a gas stream flows through the duct 24 in the direction shown by the arrow 32. Under appropriate atmospheric conditions, entrained water or ice crystals in the gas stream may form ice on the leading edge region 34 of the vane 30.

A short distance upstream of the leading edge 34 a nozzle 36 is provided in the duct wall 26. Air 38 is fed through this nozzle, creating a jet of air 40 directed along the leading edge 34 of the vane 30 and substantially perpendicular to the gas stream direction 32. Each vane 30 in the annular array is provided with a nozzle 36. The air feed to the nozzles 36 may be by any convenient means—for example, an annular manifold may surround the duct wall 26 and provide a common air supply for all the nozzles 36. The air 38 will normally be taken from a cabin or handling bleed offtake on the engine, and so this air will be at a higher temperature than the air in the gas stream 32.

Figure 3:
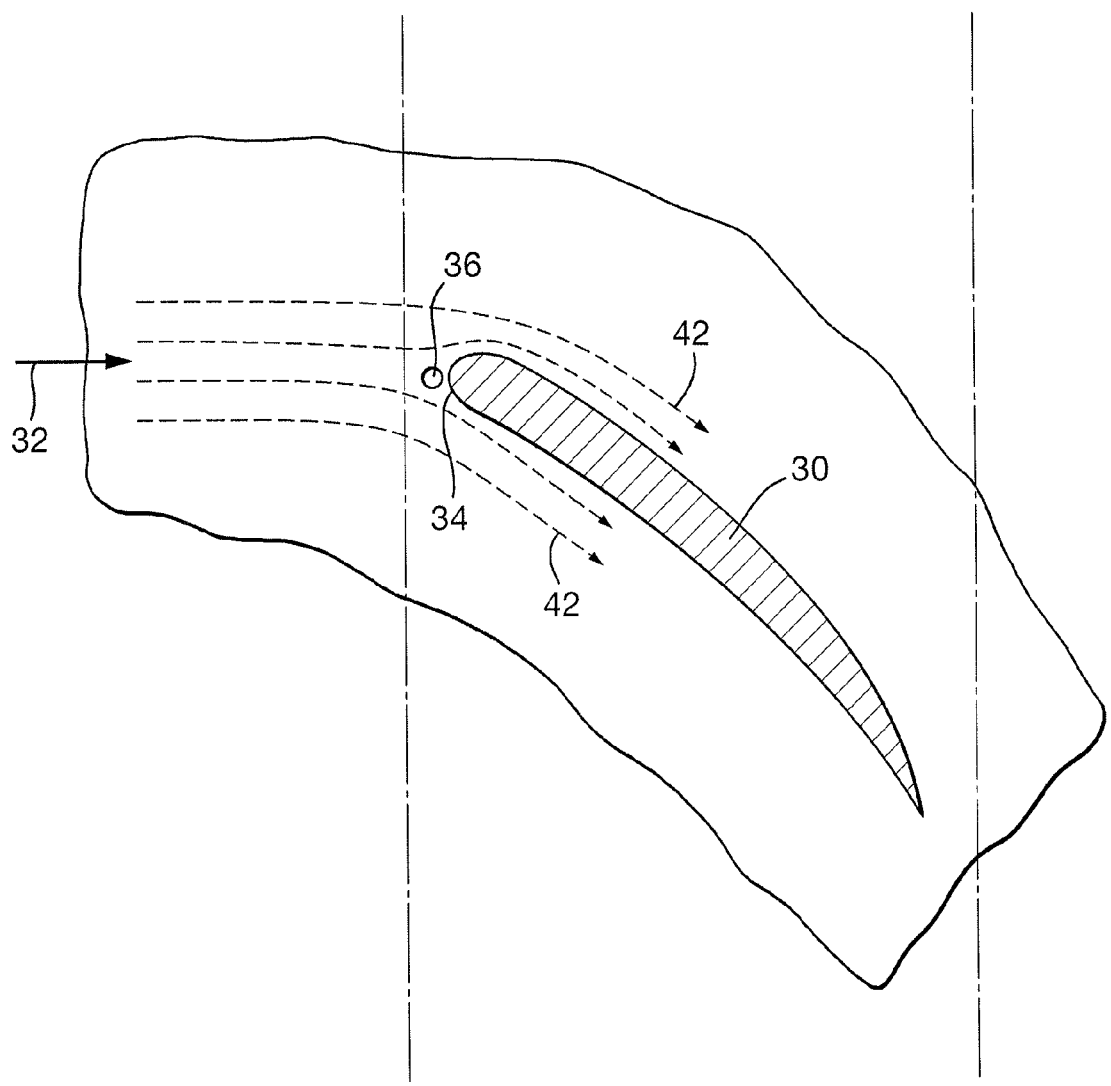
FIG. 3 is an enlarged view on the line III-III in FIG. 2.

FIG. 3 is a view on the line III-III in FIG. 2, looking towards the outer duct wall 26. The gas stream 32 flows towards the leading edge 34 of the vane 30. Dashed arrows 42 indicate how the gas stream 32 is deflected by the vane 30. There is a roughly triangular region 44, immediately upstream of the leading edge 34, in which there is relatively little movement of the gas. The nozzle 36 is positioned in this stagnation region 44. Consequently, the jet of air 40 is not significantly deflected by the gas stream 32, 42 and will flow along the leading edge 34 of the vane 30, warming it and preventing the build-up of ice. (This may be seen more clearly in FIG. 2.)

Because the jet of air 40 is not significantly deflected by the gas stream 32, 42, the injected air remains close to the boundary layer. Therefore, the heat transfer between the air and the component surface is more efficient, and the temperature increase needed in the component can be achieved with a smaller volume of injected air. If the jet of air 40 were injected elsewhere, so that it mixed with the gas stream 32, 42, a much greater volume of injected air would be needed to achieve the required heating.

This apparatus has the advantage over known de-icing methods that only the part of the vane most susceptible to icing is heated, and so the efficiency penalty of providing this heating is minimized.

Figure 4:
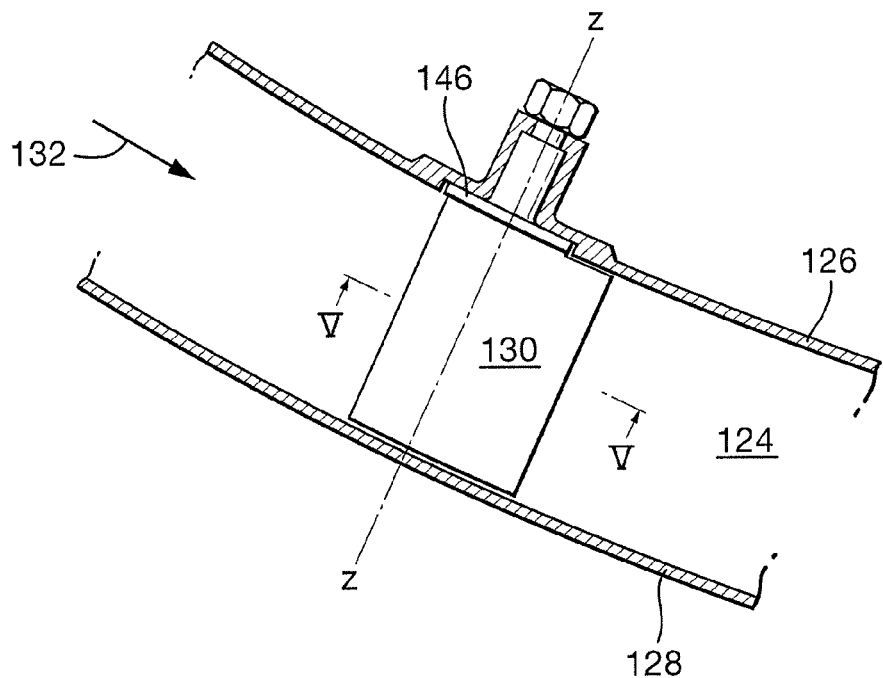
FIG. 4 is a schematic sectional view of an alternative apparatus according to the invention.
Figure 5:
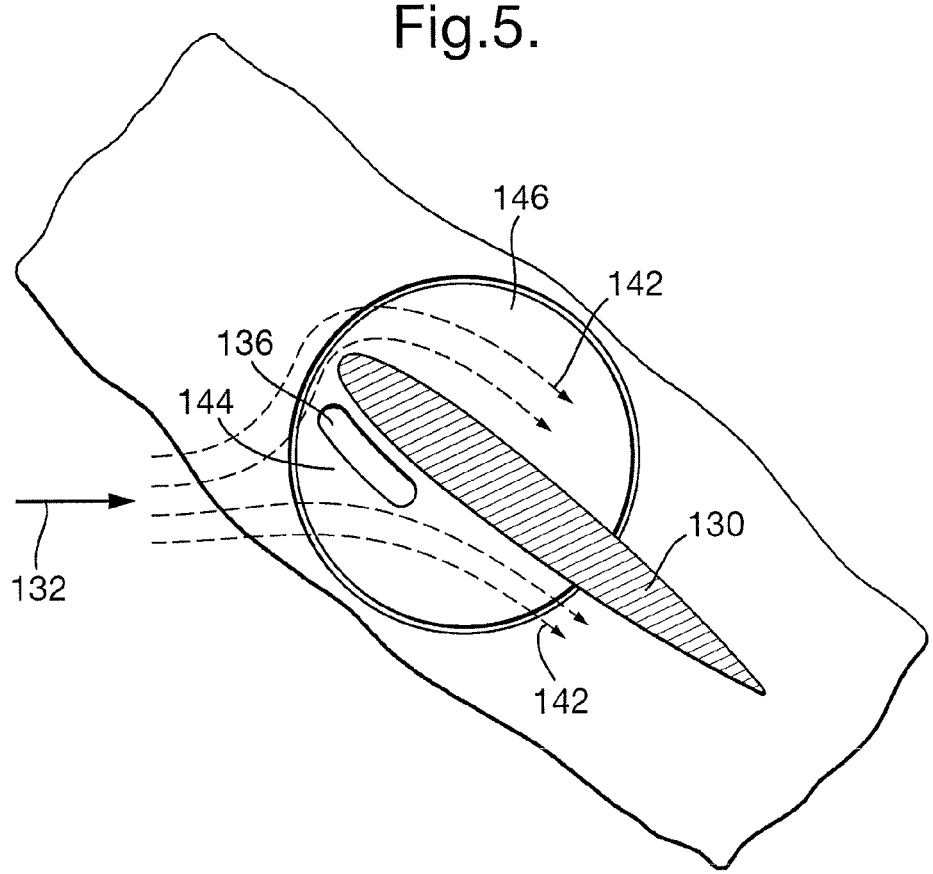
FIG. 5 is an enlarged view on the line V-V in FIG. 4.

FIGS. 4 and 5 show an alternative embodiment of the invention. An annular duct 124 is bounded by outer and inner walls 126 and 128, and contains an annular array of variable stator vanes 130 of known type, of which one is shown. The vane 130 may pivot about an axis Z-Z. At its outer end, the vane 130 is mounted on a circular mounting member 146, commonly known as a penny. The surface of the penny is shaped to conform to the profile of the outer duct wall 126, and in effect forms a part of that wall.

In use, a gas stream flows through the duct 124 in the direction shown by the arrow 132. The dashed arrows 142 indicate how the gas stream 132 is deflected by the vane 130. As in the first embodiment, shown in FIGS. 2 and 3, there is a stagnation region 144; but in contrast to the first embodiment, this region is not adjacent to the leading edge of the vane 130. A nozzle 136 in the penny 146 is located in the stagnation region 144, and directs air along the surface of the vane 130 to warm the vane and prevent the build-up of ice.

In the two embodiments of the invention that have been described, a jet of air is directed at a vane of a gas turbine engine in order to heat it and prevent the build-up of ice. It will be appreciated, by those skilled in the art, that other embodiments are possible employing the same inventive principle as in these embodiments.

In particular, the jet of air may be employed to cool a component rather than to heat it. Referring, for example, to FIGS. 2 and 3, if the air 38 were cooler than the gas stream 32 then its effect would be to cool the leading edge region 34 of the vane 30. The mechanism and advantages of such an apparatus would be exactly the same as those set out above in respect of heating a component, mutatis mutandis.

The direction of the gas stream 32, 132, relative to the aerofoil axis, need not be as shown in either of the two embodiments described, but will be dictated by the aerodynamic characteristics of a particular embodiment.

It will be appreciated that the exact position of the stagnation region 44, 144 relative to the leading edge of the vane 30, 130 will then depend on the geometry of the apparatus and the direction of the gas stream 32, 132.

Those skilled in the art will recognise that the hole 36, 136 may be of any suitable shape, as dictated by the requirements of a particular embodiment.

The invention need not be applied only to a vane or a variable vane of a gas turbine engine. It could equally well be used for a strut, or for any component (in a gas turbine, a steam turbine or any other machine) that is located in a gas stream in use and requires heating or cooling.

The invention may be used during starting of a gas turbine engine, to melt or shed ice that has built up on components while the engine has not been running.

In the first embodiment described, the air for the jet of air 40 is supplied from a bleed offtake of the gas turbine engine. In other embodiments, the air may be supplied from any convenient source within or outside the machine incorporating the component. In particular, where the invention is to be used during the starting of an aircraft gas turbine engine, the air may be supplied by another engine on the aircraft, by an APU or from a ground cart or other external source. Where the invention is used in a steam turbine, the air may be supplied from the low pressure steam circuit or from an external source of compressed air.

It may be desirable, in certain applications, to provide more than one nozzle associated with a component. The nozzles may direct the flow of air at different angles, or at different regions of the component, to optimize the heating or cooling effect.

What is claimed is:

1. An apparatus for preventing or diminishing formation of ice on a component, the component situated in use in a duct in which flows a gas stream, whereby a stagnation point is created in the region of an upstream portion of the component, the apparatus comprising:
a nozzle located in a wall of the duct and at an axial position corresponding to the axial position of the stagnation point, said nozzle positioned and connected to introduce into the gas stream a jet of air hotter than the gas stream and directed generally parallel to a surface of the component and into the region of the stagnation point.

2. An apparatus as claimed in claim 1, in which the component is a component of a gas turbine engine.

3. An apparatus as claimed in claim 1, in which the component is a vane or strut.

4. An apparatus as claimed in claim 3, in which the component is a variable vane.

5. An apparatus as claimed in claim 4, in which the variable vane comprises a mounting member, the mounting member forming a part of the duct wall, and in which the nozzle is located in the mounting member.

6. An apparatus as claimed in claim 2, in which the jet of air is fed from a bleed offtake or another gas turbine engine or an APU or a ground cart.

7. An apparatus as claimed in claim 1, and comprising a plurality of nozzles associated with the component, each nozzle creating a jet of air, in which the jets are directed at different angles.

8. An apparatus as claimed in claim 1, and comprising a plurality of nozzles associated with the component, each nozzle creating a jet of air, in which the jets are directed at different regions of the component.

9. A gas turbine engine comprising, in axial flow series:
an air intake;
a propulsive fan;

an intermediate pressure compressor;
a high pressure compressor;
a combustor;
a turbine including a high pressure turbine, an intermediate pressure turbine, a low pressure turbine, and an exhaust nozzle,
  said turbines including a plurality of components, with at least one component situated in use in a duct in which flows a gas stream, whereby a stagnation point is created in the region of an upstream portion of the component, and
  said turbines including at least one apparatus for controlling the temperature of said at least one component, said apparatus including a nozzle located in a wall of the duct and at an axial position corresponding to the axial position of the stagnation point, said nozzle positioned and connected to introduce into the gas stream a jet of air hotter than the gas stream and directed generally parallel to a surface of the component and into the region of the stagnation point.

* * * * *